United States Patent
Nautiyal et al.

(10) Patent No.: US 10,191,802 B2
(45) Date of Patent: Jan. 29, 2019

(54) EXTRACT-TRANSFORM-LOAD DIAGNOSTICS

(71) Applicant: Oracle International Corporation, Redwood Shores, CA (US)

(72) Inventors: Ispati Nautiyal, Bangalore (IN); Rajesh Balu, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 254 days.

(21) Appl. No.: 15/158,129

(22) Filed: May 18, 2016

(65) Prior Publication Data

US 2017/0068595 A1    Mar. 9, 2017

Related U.S. Application Data

(60) Provisional application No. 62/214,893, filed on Sep. 4, 2015.

(51) Int. Cl.
| | |
|---|---|
| *G06F 11/00* | (2006.01) |
| *G06F 11/10* | (2006.01) |
| *G06F 17/30* | (2006.01) |
| *G06F 11/07* | (2006.01) |

(52) U.S. Cl.
CPC .......... *G06F 11/10* (2013.01); *G06F 11/0793* (2013.01); *G06F 17/30563* (2013.01); *G06F 11/1008* (2013.01); *G06F 11/1076* (2013.01); *G06F 2201/80* (2013.01)

(58) Field of Classification Search
CPC .. G06F 11/10; G06F 11/0793; G06F 2201/80; G06F 17/30563; G06F 11/1008; G06F 11/1076; H04L 1/1045

USPC ................................ 714/751, 758, 774, 799
See application file for complete search history.

(56) References Cited

U.S. PATENT DOCUMENTS

| | | | | |
|---|---|---|---|---|
| 7,299,216 | B1 * | 11/2007 | Liang | G06F 11/0727 |
| 8,311,974 | B2 * | 11/2012 | Gong | G06F 17/30563 |
| | | | | 707/602 |
| 9,268,828 | B2 * | 2/2016 | Rausch | G06F 17/30563 |
| 2010/0251019 | A1 * | 9/2010 | Yoshida | G06F 11/1008 |
| | | | | 714/15 |
| 2013/0339823 | A1 * | 12/2013 | Meaney | H03M 13/05 |
| | | | | 714/773 |
| 2014/0032506 | A1 * | 1/2014 | Hoey | G06F 17/30303 |
| | | | | 707/691 |
| 2014/0074539 | A1 * | 3/2014 | Doering | G06Q 10/06315 |
| | | | | 705/7.25 |
| 2014/0075239 | A1 * | 3/2014 | Prathipati | H04L 29/14 |
| | | | | 714/4.1 |

(Continued)

*Primary Examiner* — Albert DeCady
*Assistant Examiner* — Osman Alshack
(74) *Attorney, Agent, or Firm* — Kilpatrick Townsend & Stockton LLP

(57) ABSTRACT

A cloud-based ETL system provides error detection, error correction and reporting of data integration flows hosted by cloud services. Categories of errors are identified using one or more checks at different points of a data integration flow and one or more actions selected based at least in part on the error category. A determination can be made whether the error category is fault tolerant and one or more actions can be selected based at least in part on the error fault tolerance to correct the error, restart a flow, or generate a notification assisting a user to correct the error.

20 Claims, 12 Drawing Sheets

(56) References Cited

U.S. PATENT DOCUMENTS

| | | | |
|---|---|---|---|
| 2014/0156638 A1* | 6/2014 | Joshi | G06F 17/30566 |
| | | | 707/722 |
| 2015/0178191 A1* | 6/2015 | Camp | G06F 12/0246 |
| | | | 711/103 |
| 2015/0347542 A1* | 12/2015 | Sullivan | G06F 17/30563 |
| | | | 707/602 |
| 2016/0259357 A1* | 9/2016 | Wepman | G05F 1/66 |

* cited by examiner

EXTRACT-TRANSFORM-LOAD DIAGNOSTICS

CROSS-REFERENCE TO RELATED APPLICATIONS

The present application is a non-provisional application of, and claims the benefit and priority under 35 U.S.C. 119(e) of U.S. Provisional Application No. 62/214,893, filed Sep. 4, 2015, entitled "ETL DIAGNOSTICS," the entire contents of which is incorporated by reference for all purposes.

BACKGROUND OF THE DISCLOSURE

In today's increasingly fast-paced business environment, organizations need to use more specialized software applications. Additionally, organizations need to ensure the coexistence of these applications on heterogeneous hardware platforms and systems and guarantee the ability to share data between applications and systems.

Traditionally, data integration being a resource-intensive procedure required a proprietary server having specially designed software that specifically configures it to perform data migration from one system to another. Errors can occur at any place along a data integration flow. As systems and service have moved from on-site servers to cloud-based systems, more opportunities are presented for errors to occur.

BRIEF SUMMARY OF THE DISCLOSURE

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, a cloud-based data integration system enables users to create a logical design which is platform and technology independent. The user can create a logical design that defines, at a high level, how a user wants data to flow between sources and targets. The tool can analyze the logical design, in view of the user's infrastructure and related cloud-based services, and create a physical design. The logical design can include a plurality of components corresponding to each source and target in the design, as well as operations such as joins or filters, and access points. Each component when transferred to the physical design generates code to perform operations on the data or configures cloud adapters that connect the cloud to on-premise repositories.

A cloud-based ETL system provides error detection, error correction, and reporting of data integration flows hosted by cloud services. Categories of errors are identified using one or more checks at different points of a data integration flow and one or more actions selected based at least in part on the error category. A determination can be made whether the error category is fault tolerant and one or more actions can be selected based at least in part on the error fault tolerance to correct the error, restart a flow, or generate a notification assisting a user to correct the error.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed disclosures, any of the presently described embodiments and/or examples, or the presently understood best mode of any innovations presented within this disclosure.

DETAILED DESCRIPTION OF THE DISCLOSURE

Figure 1:
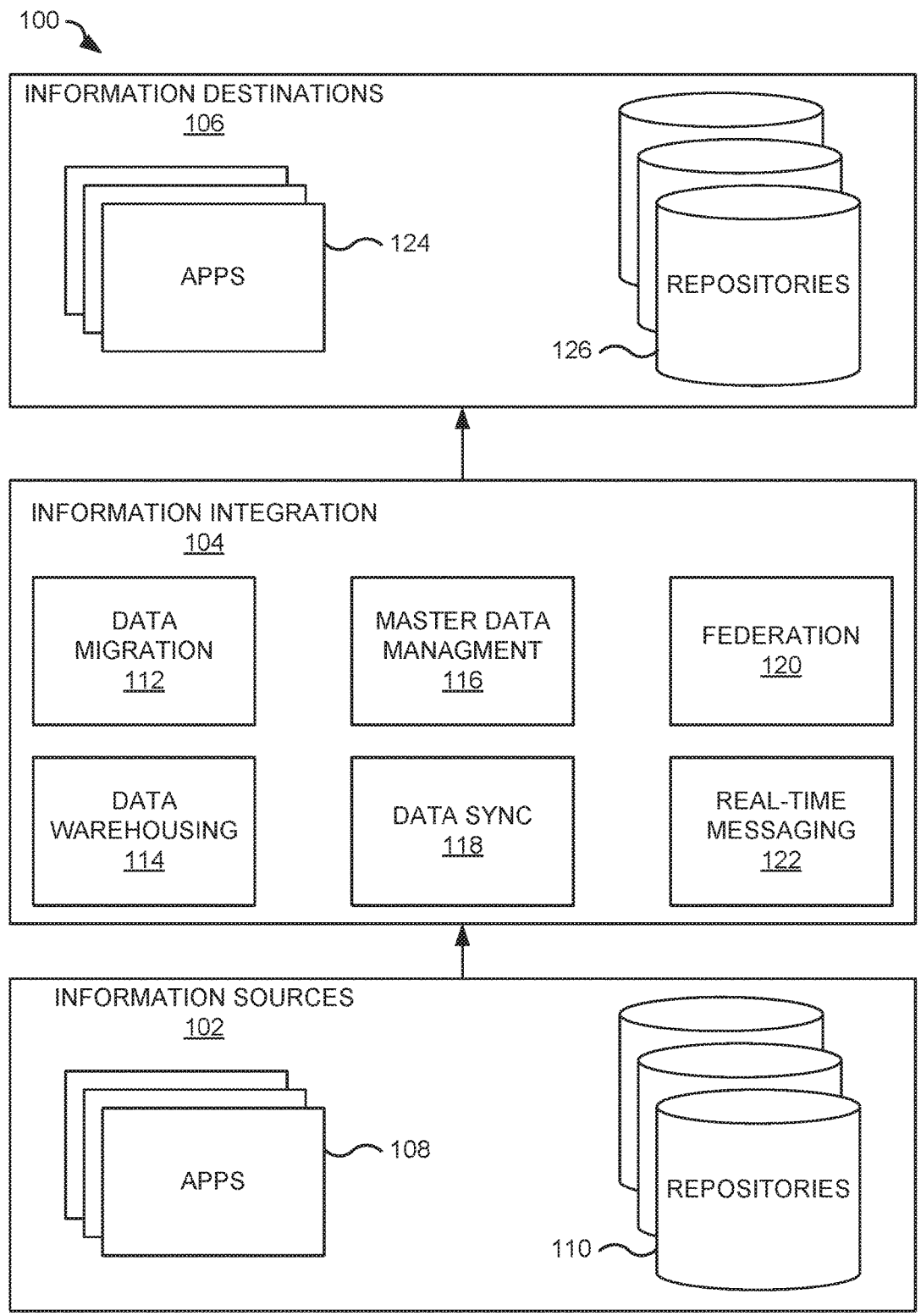
FIG. 1 is a block diagram of a data integration system according to an embodiment of the present disclosure.

Embodiments are directed to a cloud-based data integration system that enables users to create a logical design which is platform and technology independent. The user can create a logical design that defines, at a high level, how a user wants data to flow between sources and targets. The tool can analyze the logical design, in view of the user's infrastructure and related cloud-based services and create a physical design. The logical design can include a plurality of components corresponding to each source and target in the design, as well as operations such as joins or filters, and access points. Each component when transferred to the physical design generates code to perform operations on the data or configures cloud adapters that connect the cloud to on-premise repositories.

A cloud-based ETL system provides error detection, error correction and reporting of data integration flows hosted by cloud services. Categories of errors are identified using one or more checks at different points of a data integration flow and one or more actions selected based at least in part on the error category. A determination can be made whether the error category is fault tolerant and one or more actions can be selected based at least in part on the error fault tolerance to correct the error, restart a flow, or generate a notification assisting a user to correct the error.

Introduction

In the following description, for the purposes of explanation, specific details are set forth in order to provide a thorough understanding of embodiments of the disclosure. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

Data Integration Overview

FIG. 1 is a simplified block diagram of data integration system 100 according to an embodiment of the present disclosure. FIG. 1 is a simplified illustration of data integration system 100 that may incorporate various embodiments or implementations of the one or more disclosures presented within this disclosure. FIG. 1 is merely illustrative of an embodiment or implementation of an disclosure disclosed herein should not limit the scope of any disclosure as recited in the claims. One of ordinary skill in the art may recognize through this disclosure and the teachings presented herein other variations, modifications, and/or alternatives to those embodiments or implementations illustrated in the figures.

In this embodiment, data integration system 100 includes information sources 102, information integration 104, and information destinations 106. In general, information flows from information sources 102 to information integration 104 whereby the information may be consumed, made available, or otherwise used by information destinations 106. Data flows may be unidirectional or bidirectional. In some embodiments, one or more data flows may be present in data integration system 100.

Information sources 102 are representative of one or more hardware and/or software elements configured to source data. Information sources 102 may provide direct or indirect access to the data. In this embodiment, information sources 102 include one or more applications 108 and one or more repositories 110.

Applications 108 are representative of traditional applications, such as desktop, hosted, web-based, or cloud-based applications. Applications 108 may be configured to receive, process, and maintain data for one or more predetermined purposes. Some examples of applications 108 include customer relationship management (CRM) applications, financial services applications, government and risk compliance applications, human capital management (HCM), procurement applications, supply chain management applications, project or portfolio management applications, or the like. Applications 108 may include functionality configured for manipulating and exporting application data in a variety of human-readable and machine-readable formats, as is known in the art. Applications 108 may further access and store data in repositories 110.

Repositories 110 are representative of hardware and/or software elements configured to provide access to data. Repositories 110 may provide logical and/or physical partitioning of data. Repositories 110 may further provide for reporting and data analysis. Some examples of repositories 110 include databases, data warehouses, cloud storage, or the like. A repository may include a central repository created by integrating data from one or more applications 108. Data stored in repositories 110 may be uploaded from an operational system. The data may pass through additional operations before being made available in a source.

Information integration 104 is representative of one or more hardware and/or software elements configured to provide data integration services. Direct or indirect data integration services can be provided in information integration 104. In this embodiment, information integration 104 includes data migration 112, data warehousing 114, master data management 116, data synchronization 118, federation 120, and real-time messaging 122. It will be understood that information integration 104 can include one or more modules, services, or other additional elements than those shown in here that provide data integration functionality.

Data migration 112 is representative of one or more hardware and/or software elements configured to provide data migration. In general, data migration 112 provides one or more processes for transferring data between storage types, formats, or systems. Data migration 112 usually provides for manual or programmatic options to achieve a migration. In a data migration procedure, data on or provided by one system is mapped to another system providing a design for data extraction and data loading. A data migration may involve one or more phases, such a design phase where one or more designs are created that relate data formats of a first system to formats and requirements of a second system, a data extraction phase where data is read from the first system, a data cleansing phase, and a data loading phase where data is written to the second system. In some embodiments, a data migration may include a data verification phases to determine whether data is accurately processed in any of the above phases.

Data warehousing 114 is representative of one or more hardware and/or software elements configured to provide databases used for reporting and data analysis. A data warehouse is typically viewed as a central repository of data which is created by integrating data from one or more disparate sources. Data warehousing 114 may include the current storage of data as well as storage of historical data. Data warehousing 114 may include typical extract, transform, load (ETL)-based data warehouse whereby staging, data integration, and access layers house key functions. In one example, a staging layer or staging database stores raw data extracted from each of one or more disparate source data systems. An integration layer integrates disparate data sets by transforming the data from the staging layer often storing this transformed data in an operational data store (ODS) database. The integrated data is then moved to yet another database, often called the data warehouse database. The data can be arranged into hierarchical groups (often called dimensions) and into facts and aggregate facts. An access layer may be provided to help users or other systems retrieve data. Data warehouses can be subdivided into data marts whereby each data mart stores subsets of data from a warehouse. In some embodiments, data warehousing 114 may include business intelligence tools, tools to extract, transform and load data into the repository, and tools to manage and retrieve metadata.

Master data management 116 is representative of one or more hardware and/or software elements configured to manage a master copy of data. Master data management 116 may include a set of processes, governance, policies, standards and tools that consistently define and manage master data. Master data management 116 may include functionality for removing duplicates, standardizing data, and incorporating rules to eliminate incorrect data from entering a system in order to create an authoritative source of master data. Master data management 116 may provide processes for collecting, aggregating, matching, consolidating, quality-assuring, persisting and distributing data throughout an organization to ensure consistency and control in the ongoing maintenance and application use of information.

Data synchronization 118 is representative of one or more hardware and/or software elements configured to synchronize data. Data synchronization 118 may provide for establishing consistency among data from a source to a target and vice versa. Data synchronization 118 may further provide for the continuous harmonization of the data over time.

Federation 120 is representative of one or more hardware and/or software elements configured to consolidate a view of data from constituent sources. Federation 120 may transparently map multiple autonomous database systems into a single federated database. The constituent databases maybe interconnected via a computer network and may be geographically decentralized. Federation 120 provides an alternative to merging several disparate databases. A federated database, or virtual database, for example, may provide a composite of all constituent databases. Federation 120 may not provide actual data integration in the constituent disparate databases but only in the view.

Federation 120 may include functionality that provides a uniform user interface, enabling users and clients to store and retrieve data in multiple noncontiguous databases with a single query—even if the constituent databases are heterogeneous. Federation 120 may include functionality to decompose a query into subqueries for submission to relevant constituent data sources and composite the result sets of the subqueries. Federation 120 can include one or more wrappers to the subqueries to translate them into appropriate query languages. In some embodiments, federation 120 is a collection of autonomous components that make their data available to other members of the federation through the publication of an export schema and access operations.

Real-time messaging 122 is representative of one or more hardware and/or software elements configured to provide messaging services subject to a real-time constraint (e.g., operational deadlines from event to system response). Real-time messaging 122 may include functionality that guarantees an action or response within strict time constraints. In one example, real-time messaging 122 may be tasked with taking some orders and customer data from one database, combining it with some employee data held in a file, and then loading the integrated data into a Microsoft SQL Server 1000 database. Because orders need to be analyzed as they arrive, real-time messaging 122 may pass the orders through to a target database in as close to real time as possible and extract only the new and changed data to keep the workload as small as possible.

Information destinations 106 are representative of one or more hardware and/or software elements configured to store or consume data. In this embodiment, information destinations 106 may provide direct or indirect access to the data. In this embodiment, information destinations 106 include one or more applications 124 and one or more repositories 126.

Applications 124 are representative of traditional applications, such as desktop, hosted, web-based, or cloud-based applications. Applications 124 may be configured to receive, process, and maintain data for one or more predetermined purposes. Some examples of applications 124 include customer relationship management (CRM) applications, financial services applications, government and risk compliance applications, human capital management (HCM), procurement applications, supply chain management applications, project or portfolio management applications, or the like. Applications 124 may include functionality configured for manipulating and importing application data in a variety of human-readable and machine-readable formats, as is known in the art. Applications 124 may further access and store data in repositories 126.

Repositories 126 are representative of hardware and/or software elements configured to provide access to data. Repositories 126 may provide logical and/or physical partitioning of data. Repositories 126 may further provide for reporting and data analysis. Some examples of repositories 126 include databases, data warehouses, cloud storage, or the like. A repository may include a central repository created by integrating data from one or more applications 126. Data stored in repositories 126 may be uploaded or imported through information integration 104. The data may pass through additional operations before being made available at a destination.

Data Integration System

Figure 2:
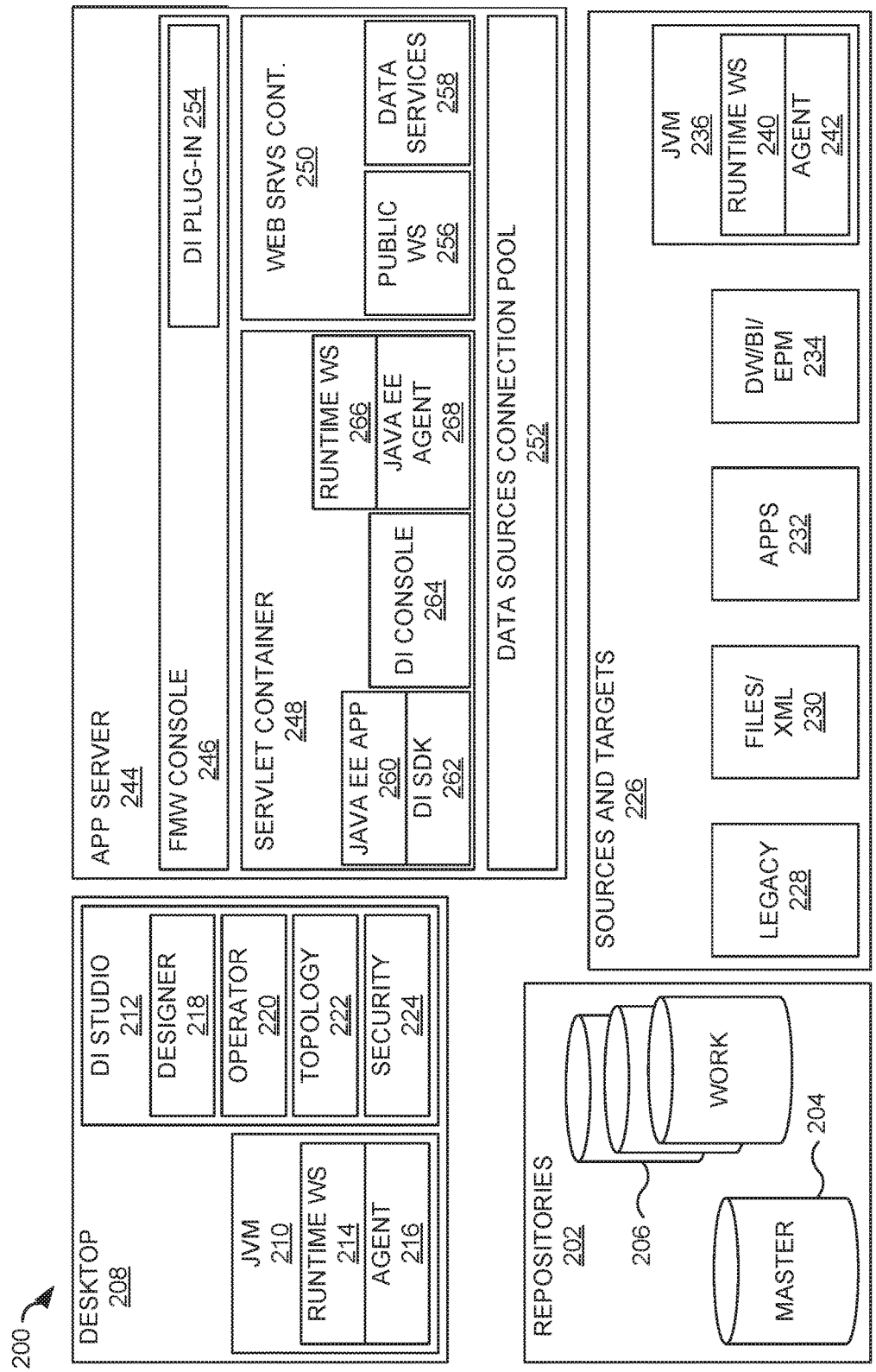
FIG. 2 is a simplified block diagram of a hardware/software stack that may be used to implement a data integration system according to an embodiment of the present disclosure.

FIG. 2 is a simplified block diagram of a hardware/software stack that may be used to implement data integration system 100 according to an embodiment of the present disclosure. FIG. 2 is merely illustrative of an embodiment or implementation of an disclosure disclosed herein should not limit the scope of any disclosure as recited in the claims. One of ordinary skill in the art may recognize through this disclosure and the teachings presented herein other variations, modifications, and/or alternatives to those embodiments or implementations illustrated in the figures. One example of components found within data integration system 100 according to this embodiment may include a data integrator (DI) (e.g., Oracle Data Integrator, a member of the ORACLE FUSION Middleware family of products provided by Oracle of Redwood Shores, Calif.). A DI may be a Java-based application that uses one or more databases to perform set-based data integration tasks. In addition, a DI can extract data, provide transformed data through Web services and messages, and create integration processes that respond to and create events in service-oriented architectures. A DI may be based at least in part on an ELT [extract-Load and Transform] architecture rather than conventional ETL [extract-transform-load] architectures.

In various embodiments, data integration system 100 provides a new declarative design approach to defining data transformation and integration processes, resulting in faster and simpler development and maintenance. Data integration system 100 thus separates declarative rules from the implementation details. Data integration system 100 further provides a unique E-LT architecture (Extract-Load Transform) for the execution of data transformation and validation processes. This architecture in embodiments eliminates the need for a standalone ETL server and proprietary engine. In some embodiments, data integration system 100 instead leverages the inherent power of RDBMS engines.

In some embodiments, data integration system 100 integrates in one or more middleware software packages and becomes a component of the middleware stack. As depicted in FIG. 2 data integration system 100 may provide run-time components as Java EE applications.

In this example, one component of data integration system 100 is repositories 202. Repositories 202 are representative of hardware and/or software elements configured to store configuration information about an IT infrastructure, metadata of all applications, projects, scenarios, and execution logs. In some aspects, multiple instances of repositories 202 can coexist in an IT infrastructure, for example Development, QA, User, Acceptance, and Production. Repositories 202 are configured to allow several separated environments that exchange metadata and scenarios (for example: Development, Test, Maintenance and Production environments). Repositories 202 further are configured to act as a version control system where objects are archived and assigned a version number.

In this example, repositories 202 are composed of at least one master repository 204 and one or more work repositories 206. Objects developed or configured for use within data integration system 100 may be stored in one of these repository types. In general, master repository 204 stores the following information: security information including users, profiles and rights, topology information including technologies, server definitions, schemas, contexts, languages and so forth, and versioned and archived objects. The one or more work repositories 206 may contain actual developed objects.

Several work repositories may coexist in data integration system 100 (for example, to have separate environments or to match a particular versioning life cycle). The one or more work repositories 206 store information for models, including schema definition, data stores structures and metadata, fields and columns definitions, data quality constraints, cross references, data lineage, and so forth. The one or more work repositories 206 may further store projects, including business rules, packages, procedures, folders, knowledge modules, variables and so forth, and scenario execution, including scenarios, scheduling information and logs. In some aspects, the one or more work repositories 206 may contain only execution information (typically for production purposes), and be designated as an execution repository.

In various embodiments, repositories 202 store one or more ETL projects. An ETL project defines or otherwise specifies one or more data models that model data attributes of data in a source or target. An ETL project further provides for data quality control as well as defining mappings to move and transform data. Data integrity control ensures the overall consistency of the data. Application data is not always valid for the constraints and declarative rules imposed by a particular source or target. For example, orders may be found with no customer, or order lines with no product, and so forth. Data integration system 100 provides a working environment to detect these constraint violations and to store them for recycling or reporting purposes.

In some embodiments of data integration system 100, there are two different types of controls: Static Control and Flow Control. Static Control implies the existence of rules that are used to verify the integrity of application data. Some of these rules (referred to as constraints) may already be implemented in data servers (using primary keys, reference constraints, etc.). Data integration system 100 allows for the definition and checking of additional constraints, without declaring them directly in a source. Flow Control relates to targets of transformation and integration processes that implement their own declarative rules. Flow Control verifies an application's incoming data according to these constraints before loading the data into a target. Flow control procedures are generally referred to as mappings.

An ETL project can be automated into a package that can be deployed for execution in a runtime environment. Accordingly, the automation of data integration flows is achieved by sequencing the execution of the different steps (mappings, procedures, and so forth) in a package and by producing a production scenario containing ready-to-use code for each of these steps. A package is typically made up of a sequence of steps organized into an execution diagram. Packages are the main objects used to generate scenarios for production. They represent the data integration workflow and can perform jobs, such as for example: start a reverse-engineering process on a datastore or a model, send an email to an administrator, download a file and unzip it, define the order in which mappings must be executed, and define loops to iterate over execution commands with changing parameters.

A scenario is designed to put a source component (mapping, package, procedure, variable) into production. A scenario results from the generation of code (SQL, shell, and so forth) for this component. Once generated, the code of the source component is frozen and the scenario is stored inside repositories 202, such as one or more of work repositories 206. A scenario can be exported and then imported into different production environments.

In various embodiments, data integration system 100 is organized around repositories 202 in a modular fashion accessed by Java graphical modules and scheduling agents. Graphical modules can be used to design and build one or more integration processes stored in repositories 202. Administrators, Developers and Operators may use a development studio to access repositories 202. Agents can be used to schedule and coordinate a set of integration tasks associated with an integration process stored in repositories 202. For example, at runtime, an agent deployed on a desktop, web services, or otherwise in communication with a source coordinates the execution of one or more integration processes. The agent may retrieve code stored in master repository 204, connect to various source and target systems, and orchestrate an overall data integration process or scenario.

In this embodiment, data integration system 200 includes desktop 208 that may include one or more of the above discussed graphical modules and/or agents. Desktop 208 is representative of one or more desktop or workstation computing devices, such as personal computers, laptops, netbooks, tablets, and the like. Desktop 208 includes a Java virtual machine (JVM) 210 and Data Integrator (DI) Studio 212. Java virtual machine (JVM) 210 is a virtual machine that can execute Java bytecode. JVM 210 is most often implemented to run on an existing operating system, but can also be implemented to run directly on hardware. JVM 210 provides a run-time environment in which Java bytecode can be executed, enabling features such as runtime web service (WS) 214 and agent 216. JVM 210 may include a Java Class Library, a set of standard class libraries (in Java bytecode) that implement the Java application programming interface (API), and other elements that form a Java Runtime Environment (JRE).

Agent 216 is configured to schedule and coordinate a set of integration tasks associated with one or more integration processes stored in repositories 202. For example, at runtime, an agent coordinates the execution of integration processes. The agent may retrieve code stored in master repository 204, connect to various source and target systems, and orchestrate an overall data integration process or scenario.

Referring again to FIG. 2, a DI Studio 212 includes hardware and/or software elements configured to design data integration projects. In this example, DI Studio 212 includes four graphical modules or navigators that are used to create and manage data integration projects, namely, designer module 218, operator module 220, topology module 222, and security module 224. Designer module 218 is a module configured to define data stores (tables, files, Web services, and so on), data mappings, and packages (sets of integration steps, including mappings). In various embodiments, designer module 218 defines declarative rules for data transformation and data integrity. Accordingly, project development takes place in designer module 218. Additionally, in designer module 218, is where database and application metadata are imported and defined. Designer module 218, in one embodiment, uses metadata and rules to generate data integration scenarios or load plans for production. In general, designer module 218 is used to design data integrity checks and to build transformations such as for example: automatic reverse-engineering of existing applications or databases, graphical development and maintenance of transformation and integration mappings, visualization of data flows in the mappings, automatic documentation generation, and customization of generated code.

Operator module 220 is a module configured to view and manage production integration jobs. Operator module 220, thus, manages and monitors data integration processes in production and may show execution logs with error counts, the number of rows processed, execution statistics, the actual code that is executed, and so on. At design time, developers can also use operator module 220 for debugging purposes in connection with designer module 218.

Topology module 222 is a module configured to create and manage connections to datasources and agents. Topology module 222 defines the physical and logical architecture of the infrastructure. Infrastructure or projects administrators may register servers, database schemas and catalogs, and agents in a master repository through topology module 222. Security module 224 is a module configured to manage users and their repository privileges.

In general, a user or process interacts with designer module 218 to create a data integration project having one or more data integration processes for sources and targets 226. Each data integration process includes at least one data integration task. In some embodiments, a data integration task is defined by a set of business rules indicative of what bit of data is to be transformed and combined with other bits as well as technical specifics of how the data is actually extracted, loaded, and so on. In preferred embodiments, a data integration task is specified using a declarative approach to build data mappings. A mapping is an object that populates one datastore, called the target, which data coming from one or more other datastores, known as sources. In general, columns in the source datastore are linked to the columns in the target datastore through mapping. A mapping can be added into a package as a package step. As discussed above, a package defines a data integration job. A package is created under a project and is made up of an organized sequence of steps, each of which can be a mapping or a procedure. A package can have one entry point and multiple exit points.

In some embodiments, when creating a new mapping, a developer or technical business user interacts with designer 218 to first define which data is integrated and which business rules should be used. For example, the developer may specify what tables are to be joined, filters to be applied, and SQL expressions to be used to transform data. The particular dialect of SQL that is used is determined by the database platform on which the code is to be executed. Then, in a separate step, technical staff can interact with designer 218 to choose the most efficient way to extract, combine, and then integrate this data. For example, the technical staff may use database-specific tools and design techniques such as incremental loads, bulk-loading utilities, slowly changing dimensions, and changed-data capture.

In this embodiment, mappings can be created for sources and targets 226. Sources and targets 226 may include one or more legacy applications 228, one or more files/XML documents 230, one or more applications 232, one or more data warehouses (DW), business intelligence (BI) tools and applications, and enterprise process management (EPM) tools and applications 234, and one or more JVMs 236 (including runtime web service 240 and agent 242).

Figure 3:
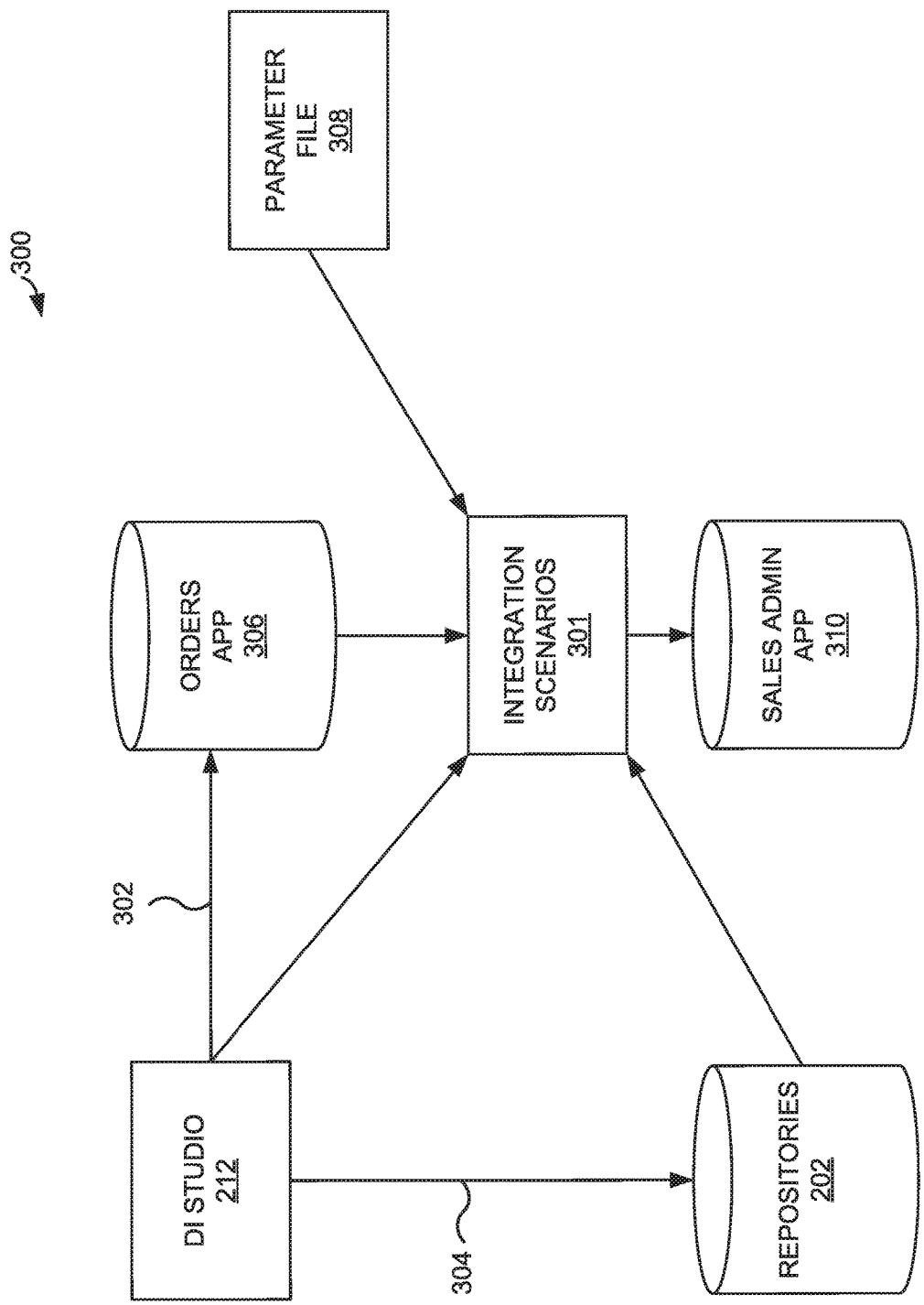
FIG. 3 is a block diagram of an environment having various heterogeneous data sources for which data integration scenarios may be created in various embodiments of the present disclosure.

FIG. 3 is a block diagram of environment 300 having various heterogeneous data sources for which data integration scenarios may be created in various embodiments of the present disclosure. In this example, environment 300 includes DI Studio 212 and repositories 202. Repositories 202 contain all of the metadata required to generate integration scenarios 301. A user or process interacts with DI Studio 212 to create integration scenarios 300 using data integrity controls 302 and declarative rules 304.

Orders application 306 is representative of an application for tracking customer orders. An "Orders Application" data model is created to represent data stored in Orders application 306 as well as any data integrity controls or conditions. For example, the "Orders Application" data model may be based at least in part on a Hyper Structured Query Language Database (HSQLDB) mapping and include five datastores, SRC_CITY, SRC_CUSTOMER, SRC_ORDERS, SRC_ORDER_LINES, SRC_PRODUCT, and SRC_REGION.

Parameter file 308 is representative of a flat file (e.g., ASCII) issued from a production system containing a list of sales representatives and the segmentation of ages into age ranges. In this example, a "Parameter" data model is created to represent the data in the flat file. For example, the "Parameter" data model may be based at least in part on a file interface and include two datastores, SRC_SALES_PERSON and SRC_AGE_GROUP.

Sales administration application 310 is representative of an application for tracking sales. The sales administration application 310 may be a data warehouse populated with transformations of data from orders application 306 and parameter file 308. A "Sales Administration" data model is created to represent data stored in sales administration application 310 as well as any data integrity controls or conditions or transformations. For example, the "Sales Administration" data model may be based at least in part on a Hyper Structured Query Language Database (HSQLDB) mapping and include six datastores, TRG_CITY, TRG_COUNTRY, TRG_CUSTOMER, TRG_PRODUCT, TRG_PROD_FAMILY, TRG_REGION, and TRG_SALE.

Figure 4A:
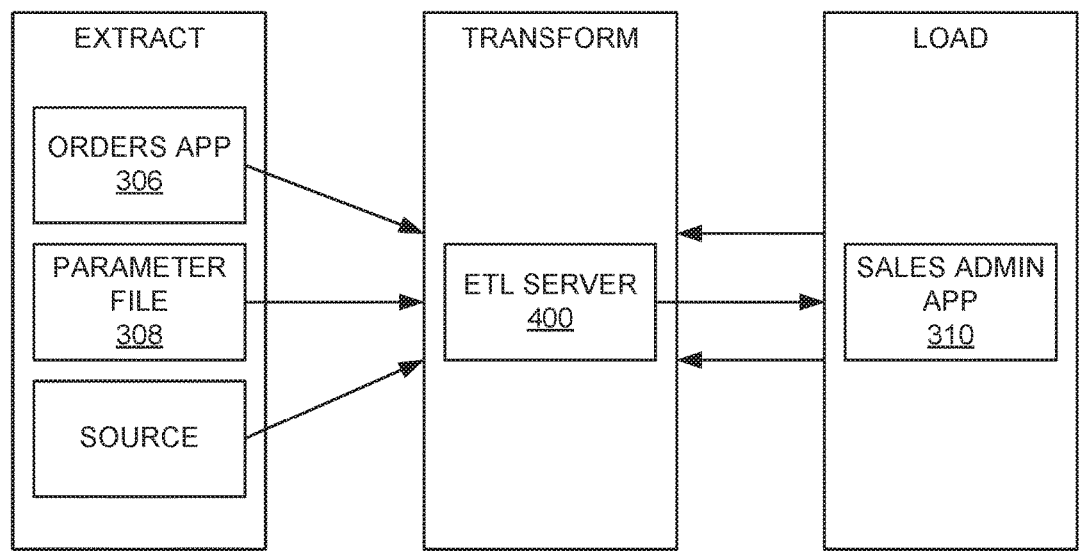
FIGS. 4A and 4B depict simplified data flows in conventional data integration processing that may be performed by the data integration system.
Figure 4B:
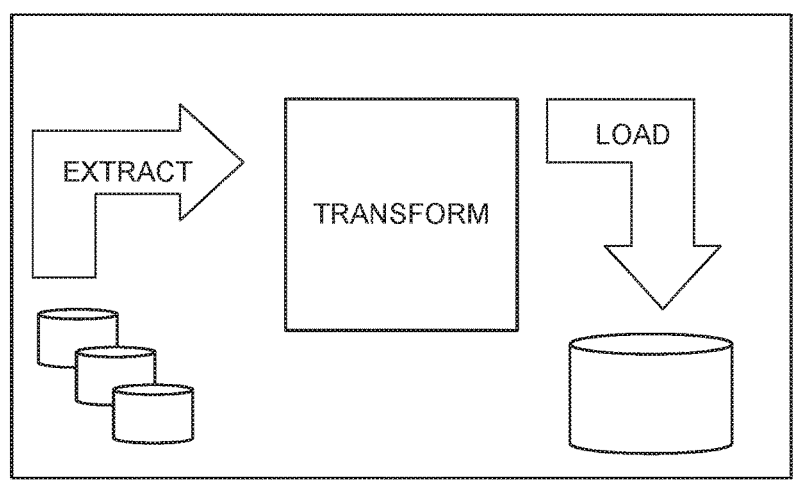

FIGS. 4A and 4B depict simplified data flows in conventional data integration processing that may be performed by data integration system 100. In this example, data from orders application 306, parameter file 308, and one or more other optional or additional sources flow through a traditional ETL process targeted to sales administration application 310. Data transforms occur in a separate ETL server 400. The scenario requires dedicated or proprietary resources, results in poorer performance, and incurs high costs.

Figure 5A:
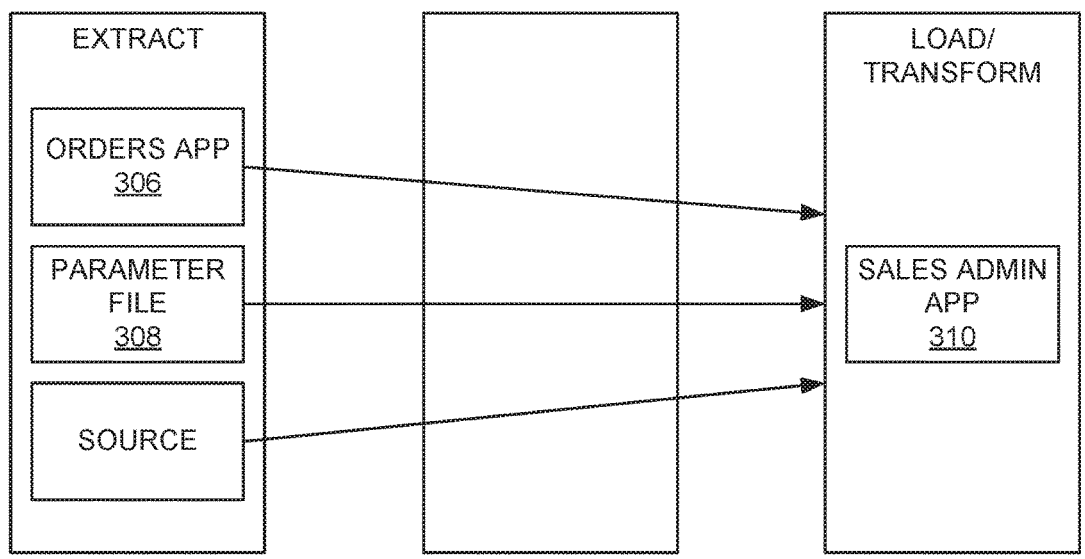
FIGS. 5A and 5B depict simplified data flows in next generation data integration processing that may be performed by the data integration system, in accordance with an embodiment of the present disclosure.
Figure 5B:
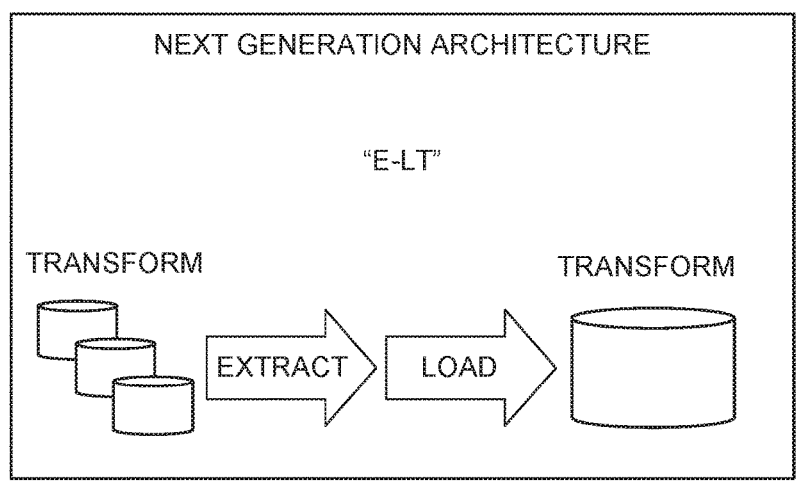

FIGS. 5A and 5B depict simplified data flows in next generation data integration processing that may be performed by data integration system 100, in accordance with an embodiment of the present disclosure. In this example, data from orders application 306, parameter file 308, and one or more other optional or additional sources flow through E-LT process targeted to sales administration application 310. Data transforms leverage existing resources resulting in higher performance and efficiency. As described above, prior ETL systems required dedicated and/or proprietary infrastructure to perform data transforms. This was done, in part, to accommodate unknown user infrastructures. For example, without knowing what types of databases are being used, prior ETL systems were unable to anticipate what transform operations would be available in a given system. However, this results in under-utilized resources, such as the user's existing databases and servers which are capable of executing the appropriate data transforms without any dedicated and/or proprietary infrastructure.

In accordance with an embodiment, the present disclosure leverages the user's existing infrastructure by enabling the user to customize a data integration process according to the user's particular needs. For example, when a data integration plan is designed, it can be divided into discrete portions which are executable by a single system, referred to as execution units. Once a data integration plan has been divided into a plurality of execution units, the user can be presented with a physical plan based at least in part on the user's infrastructure and system resources. This plan can be further customized by the user to change which user systems execute which execution units. For example, a user may be presented with a plan in which a join operation is executed on a first database, and the user may customize the plan by moving the join operation to a second database.

As shown in FIG. 5B, this results in an extract-load-transform (E-LT) architecture that does not rely on a stand-alone transform server which characterized prior ETL systems. Instead, as described above, data transforms can be performed on the user's existing infrastructure. The E-LT architecture provides users with greater flexibility while reducing costs associated with acquiring and maintaining proprietary transform servers.

Referring again to FIG. 2, agents can be used to schedule and coordinate a set of integration tasks associated with an integration process. For example, at runtime, an agent coordinates the execution of integration processes. The agent may retrieve code stored in master repository 204, connect to the various source and target systems and orchestrates an overall data integration process or scenario. In various embodiments, there are two types of agents. In one example, a standalone agent is installed on desktop 208, such as agent 216. In another example, an application server agent can be deployed on application server 226 (such as a Java EE Agent deployed on an Oracle WebLogic Server) and can benefit from the application server layer features such as clustering for High Availability requirements. In yet another example, an agent can be deployed on sources and targets 226, such as agent 242.

In this embodiment, data integration system 100 includes application server 244 that may include one or more of the above discussed agents. Application server 244 is representative of one or more application servers, web-servers, or hosted applications. In this example, application server 244 includes FMW console 246, servlet container 248, web services container 250, and data sources connection pool 252.

FMW console 246 is representative of one or more hardware and/or software elements configured to manage aspects of application server 244, such as information related to servlet container 248, web services container 250, and data sources connection pool 252. For example, FMW console 246 may be a browser-based, graphical user interface used to manage an Oracle WebLogic Server domain. FMW console 246 may include functionality to configure, start, and stop WebLogic Server instances, configure WebLogic Server clusters, configure WebLogic Server services, such as database connectivity (JDBC) and messaging (JMS), configure security parameters, including creating and managing users, groups, and roles, configure and deploy Java EE applications, monitor server and application performance, view server and domain log files, view application deployment descriptors, and edit selected run-time application deployment descriptor elements. In some embodiments, FMW console 246 includes DI plug-in 254 providing FMW console 246 with access to data integration processes in production and may show execution logs with error counts, the number of rows processed, execution statistics, the actual code that is executed, and so forth.

Servlet container 248 is representative of one or more hardware and/or software elements configured to extend the capabilities of application server 244. Servlets are most often used to process or store data that was submitted from an HTML form, provide dynamic content such as the results of a database query, and manage state information that does not exist in the stateless HTTP protocol, such as filling the articles into the shopping cart of the appropriate customer. A servlet is typically a Java class in Java EE that conforms to the Java Servlet API, a protocol by which a Java class may respond to requests. To deploy and run a servlet, servlet container 248 is used as a component of a web server that interacts with servlets. Accordingly, servlet container 248 may extend functionality provided by public web service 256 and data services 258 of web services container 250 as well as access to data pools provided by data sources connection pool 252. Servlet container 248 is also responsible for managing the lifecycle of servlets, mapping a URL to a particular servlet and ensuring that the URL requester has the correct access rights.

In this example, servlet container 248 includes Java EE application 260 associated with DI SDK 262, DI console 264, and runtime web service 266 associated with Java EE agent 268. DI SDK 262 provides a software development kit (SDK) for data integration and ETL design. DI SDK 262 enables automation of work that is common and very repetitive allowing a user to script repetitive tasks.

DI console 264 is a Java Enterprise Edition (Java EE) application that provides Web access to repositories 202. DI console 264 is configured to allow users to browse Design-Time objects, including projects, models, and execution logs. DI console 264 may allow users to view flow maps, trace the source of all data, and even drill down to the field level to understand the transformations used to build the data. In addition, end users can launch and monitor scenario execution through DI console 264. In one aspect, DI console 264 provides administrators with the ability to view and edit Topology objects such as Data Servers, Physical and Logical Schemas as well as to manage repositories 202.

Data Scenario Design and Development

As discussed above, a data integration scenario may be initiated with designer module 218 of DI Studio 212 and connect to repositories 202. The user may interact with one or more user interface features to create a new data integration project or select from existing data integration projects stored in, for example, master repository 204. In general, designer module 218 is used to manage metadata, to design data integrity checks, and to build transformations. In various embodiments, the main objects handled through designer module 218 are models and projects. Data models contain all of the metadata in a data source or target (e.g., tables, columns, constraints, descriptions, cross-references, etc.). Projects contain all of the loading and transformation rules for a source or target (e.g., mappings, procedures, variables, etc.). The user may not only create a data model, but also develop any data integrity checks for the data in the data models. Additionally, the user may specify mappings, procedures, variables for projects that provide data integrity and transforms for the data in a flow that loads data from a source into a target.

Data Scenario Deployment and Diagnostics

A data integration scenario can be a very fragile process. As illustrated above, there are multiple locations along a data flow where an error can occur. For example, an error can occur loading a huge volume of data from a data source. In another example, a process can hang or exit from bad data, a bad configuration, errors in the code, system issues, or the like. As data integration scenario incorporate components hosted using cloud-based service or are themselves initiated in the cloud, additional errors can present themselves.

Accordingly, in embodiments, a cloud-based ETL system provides error detection, error correction and reporting of data integration flows hosted by cloud services. Categories of errors are identified using one or more checks at different points of a data integration flow and one or more actions selected based at least in part on the error category. A determination can be made whether the error category is fault tolerant and one or more actions can be selected based at least in part on the error fault tolerance to correct the error, restart a flow, or generate a notification assisting a user to correct the error.

Figure 6:
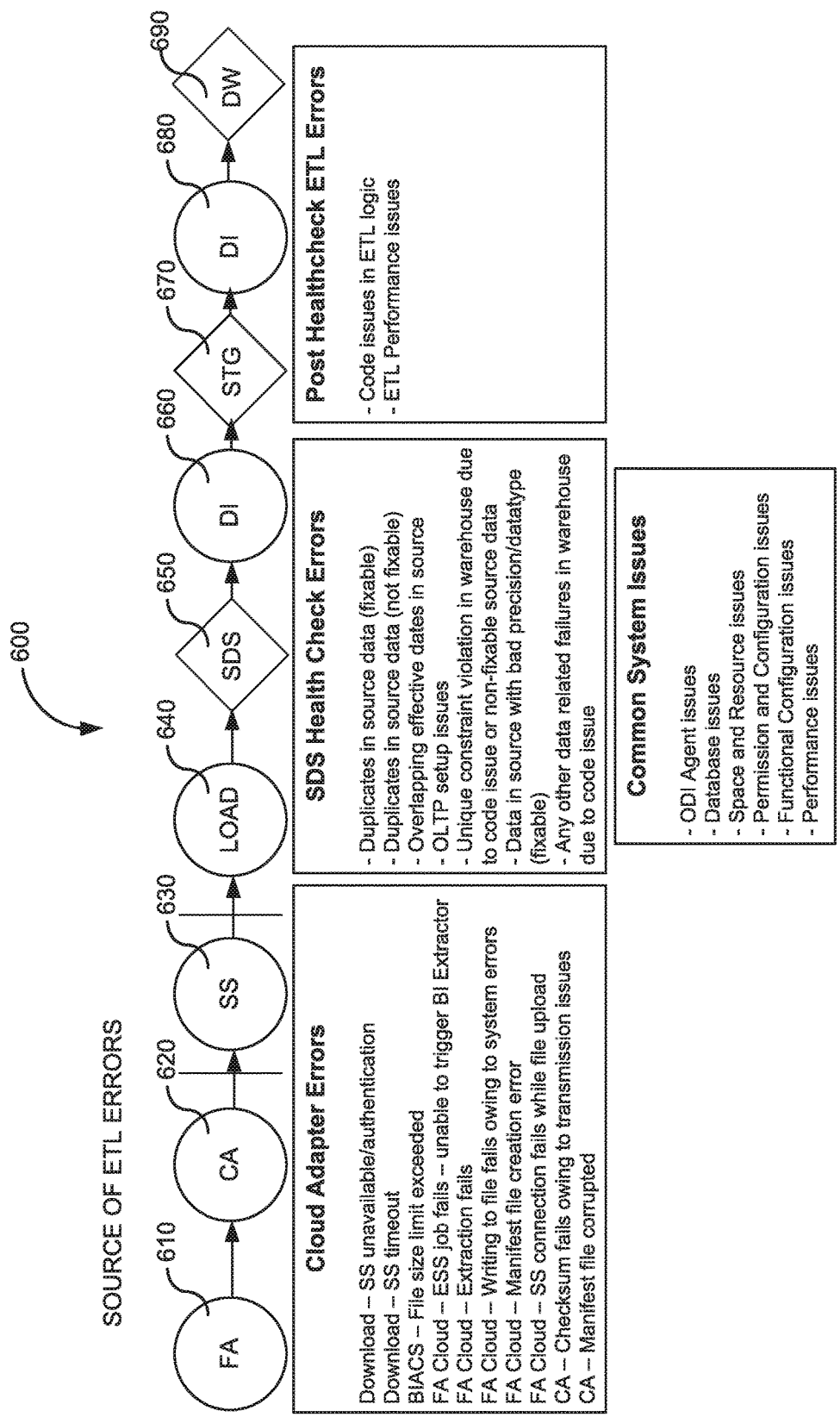
FIG. 6 is a simplified diagram illustrating one or more sources of errors in a data integration scenario that can occur in a cloud-based data integration system in one embodiment according to the present disclosure.

FIG. 6 is a simplified diagram illustrating one or more sources of errors in a data integration scenario 600 that can occur in a cloud-based data integration system in one embodiment according to the present disclosure.

FA 610 is representative of one or more cloud-based applications. FA 610 typically includes a data source or stores data utilizing a cloud-based repository. FA 610 may further include an adapter to an on-site data source. Some examples of errors that may occur with respect to FA 610 can include unavailable data, authentication errors, inability to trigger job extraction, system errors, manifest file errors, or the like.

CA 620 is representative of one or more cloud-based adapters for accessing FA 610. CA 620 can integrate directly with FA 610 or bypass integration with FA 610 to extract data associated with FA 610. CA 620 can stage the data extracted from FA 610 using SS 630. Some examples of errors that may occur with respect to CA 620 can include hanging, stalling, stuck download, checksum fails, manifest files errors, or the like.

SS 630 is representative of one or more cloud-based storage services. SS 630 can temporarily store or cache data associated with a data flow for further processing. Some examples of errors that may occur with respect to SS 630 can include hanging, stalling, stuck download, checksum fails, manifest files errors, or the like.

Load 640 is representative of the data being loaded from SS 630 into SDS 650. SDS 650 is representative of one or more cloud-based source dependent data stores. Separate schemas can usually be stored on the same database and contain data extracted from SS 630 during load 640. Load 640 can treat a schema associated with SS 630 as the source and a schema associated with SDS 650 as the target of processes that maintains a replicated SDS 650, stores deletes, and provides additional optimizations for incremental ETL. Some examples of errors that may occur with respect to load 640 or SDS 650 can include data duplication errors, data type errors, data validation errors, constraint violations, other data failures, or the like.

DI 660, Stg 670, and DI 680 are representative of one or more cloud-based data integration systems having metadata that stores definitions used to generate the SDS schemas and to support ETL processes, staging tables used during the ETL processes, and any code used to effect the ETL process. Some examples of errors that may occur with respect to DI 660, Stg 670, and DI 680 can include data errors, data failures, code execution errors, staging errors, or the like. There also may be some post ETL issues and performances issue that can be triggered.

DW 690 is representative of one or more cloud-based data warehouses. DW 690 is generally the final target of the ETL process and store the data originating from FA 610 in a data warehouse. The final data can be manipulated and transformed via the data integration scenario and loaded into the data warehouse.

Figure 7:
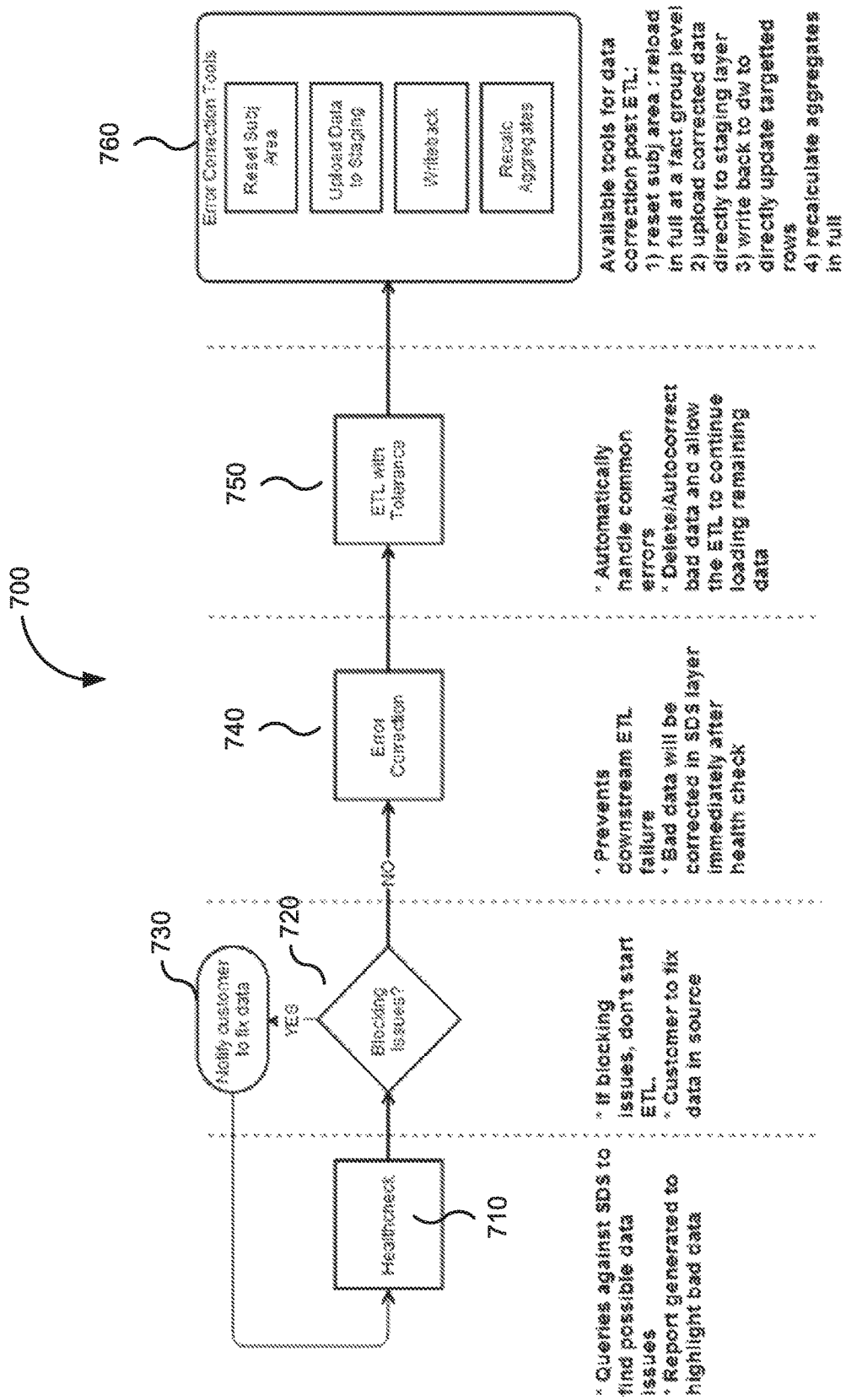
FIG. 7 is a simplified diagram illustrating an overall flow for diagnosing ETL errors in a cloud-based data integration system in one embodiment according to the present disclosure.

FIG. 7 is a simplified diagram illustrating flow 700 for diagnosing ETL errors in a cloud-based data integration system in one embodiment according to the present disclosure. In step 710, one or more health checks are performed. A health check can be a proactive, rather than reactive step, to identify an error in a data integration scenario. In one embodiment, one or more queries can be made against SDS 650 to determine issues with respect to the data. If an issue is found with respect to the data, one or more reports, notifications, task items, or the like can be generated and communicated to an appropriate user or system. The report can highlight the data in order to facilitate correction by the user.

In step 720, a determination is made whether there are any blocking issues with respect to the data. If the determination is made that there are blocking issues, the user or customer is notified in step 730. The issue can be captured and send to the customer via one or more notifications. The notification can describe the issue, the data, and one or more ways of correcting the issue. The customer can then fix any data in the source that might be causing the issue. The process can restart in step 710 thereby performing one or more health checks.

If the determination is made that there are not blocking issues, in step 740, error correction is implemented to prevent downstream ETL failures. As indicated above, errors may occur at multiple locations along a data integration flow. Errors can be categorized according to whether the error can be corrected or is fault tolerant. If there is a certain category of error that is correctable, the data that cause the error can be forwarded for error correction allowing the ETL process to resume. If there is a certain category of errors that is not correctable, the data that cause the error can be rejected and logged. In step 750, if the error is fault tolerant, then any remaining data that does not cause an issue can be process. A notification can be generated that describes what data was rejected and what data was processed.

In step 760, a variety tools can be made available to the customer for correcting errors. For example, the customer can be presented with one or more tools that enable the customer to reset a subject area, manually upload data to a staging area, writeback data to the data warehouse directly updating targeted rows, recalculate aggregates, or the like.

Figure 8:
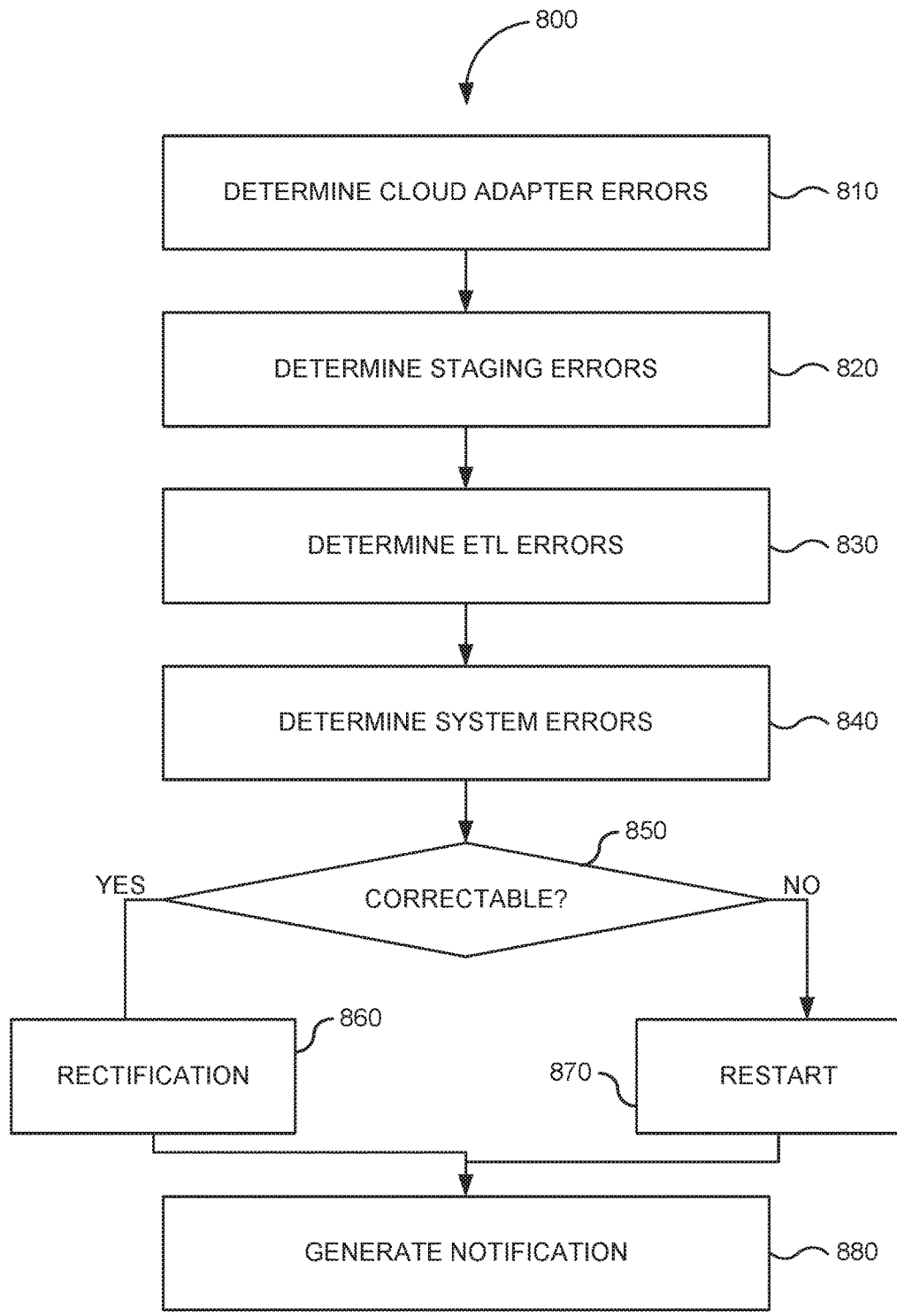
FIG. 8 is a flowchart of a method for detecting errors in a data integration scenario in one embodiment according to the present disclosure.

FIG. 8 is a flowchart of method 800 for detecting errors in a data integration scenario in one embodiment according to the present disclosure. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 810, one or more cloud adapter errors are determined. One or more health checks can be implemented that determine availability of an application, application data source, application adapter/connector, the integrity or validity of source data, or the like prior to beginning the ETL process. A variety of technology components can be supported allowing errors having to do with the data having an unexpected value, size, type, or the like and be categorized as potentially correctable or fault tolerant.

In step 820, one or more staging errors are determined. Flow errors can also result in transformed data having unexpected value, size, type, or the like. In step 830, one or more ETL errors are determined. ETL errors can include errors having to do with the execution of code implementing the data integration scenario. In step 840, one or more system errors are determined. System errors can result from various components of the ETL process being unavailable, unreachable, or otherwise behaving in an unexpected manner.

In step 850, a determination is made whether any determine errors are correctable. If a determination is made in step 850 that an error is correctable, rectification can occur in step 860. Rectification allows data to be correct, systems to be restarted, connections to be re-established or the like in a manner that allows the ETL process to proceed. A set of rules can be used to implement rectification. Each rule can specific one or more conditions that when satisfied cause one or more actions to be performed to rectify an error. Rectification can also include a determination whether an error is fault tolerant as described further with respect to FIG. 10.

If a determination is made in step 850 that an error is not-correctable, a restart is initiated in step 870. The restart can include rolling back any intermediate data created up to the point of the error. In step 880, one or more notifications can be generated.

In some embodiments, customer data is not allowed to leave the cloud. Thus, notifications can include indications of the error and provide the customer access to a portal to one or more tools for viewing and correcting the error.

Figure 9:
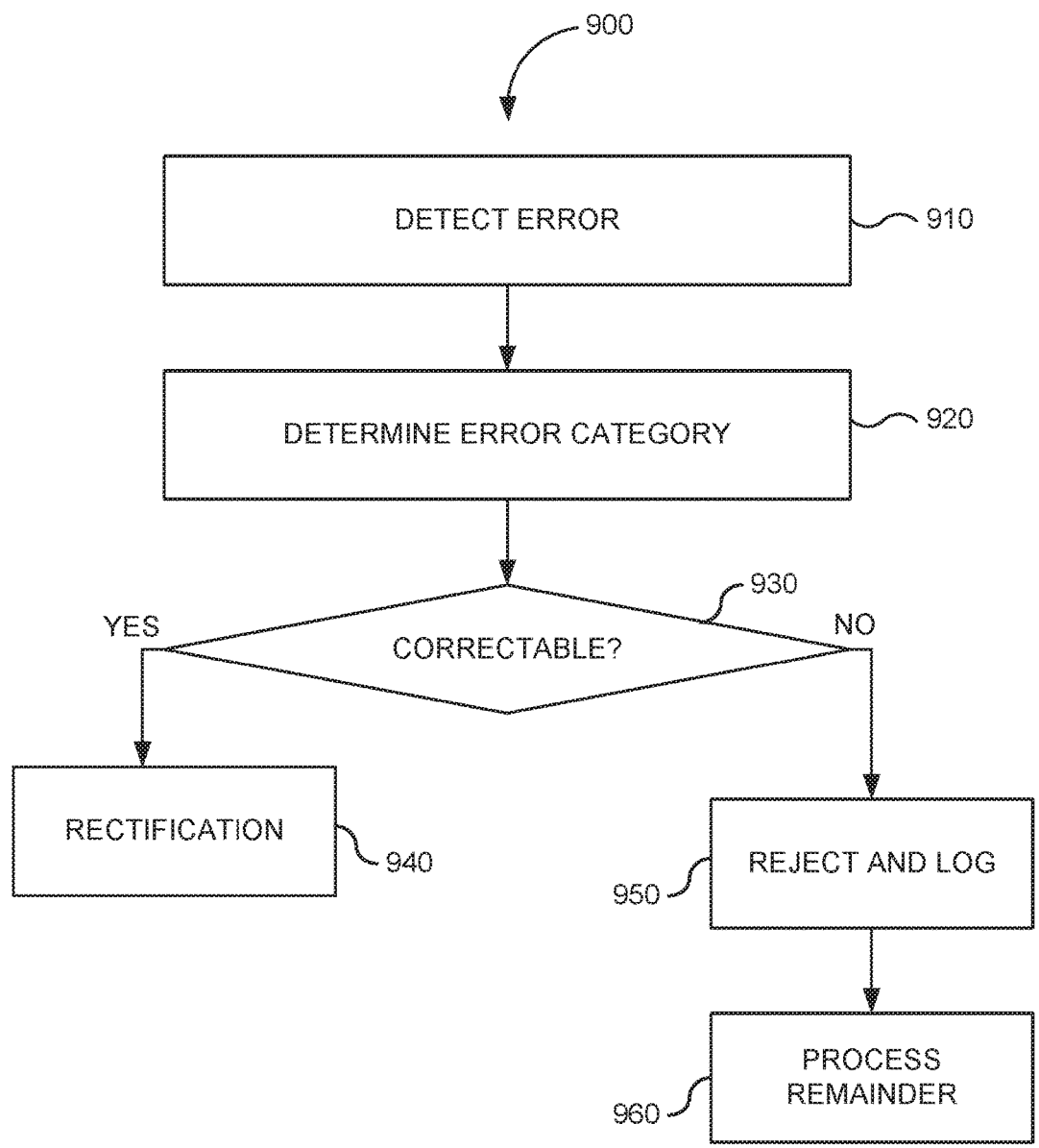
FIG. 9 is a flowchart of a method for correcting errors in a data integration scenario in one embodiment according to the present disclosure.

FIG. 9 is a flowchart of method 900 for correcting errors in a data integration scenario in one embodiment according to the present disclosure. Implementations of or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In step 910, one or more errors are detected. In step 920, an error category is determined. The error category can include source data errors, flow errors, system errors, ETL errors, or the like. In step 930, a determination is made whether the data associated with the error is correctable. If the data associate with the error is correctable, rectification can occur in step 940.

If the data associated with the error is not correctable, in step 950, the data that is not correctable is rejected and log. Data associated with the error that is fault tolerant can be processed in step 960. The customer can be notified what portion of the data was rejected and what portion of the data was processed. This allows the user to restart the data integration flow using a small data set that originally processed.

Exemplary System(s)

Figure 10:
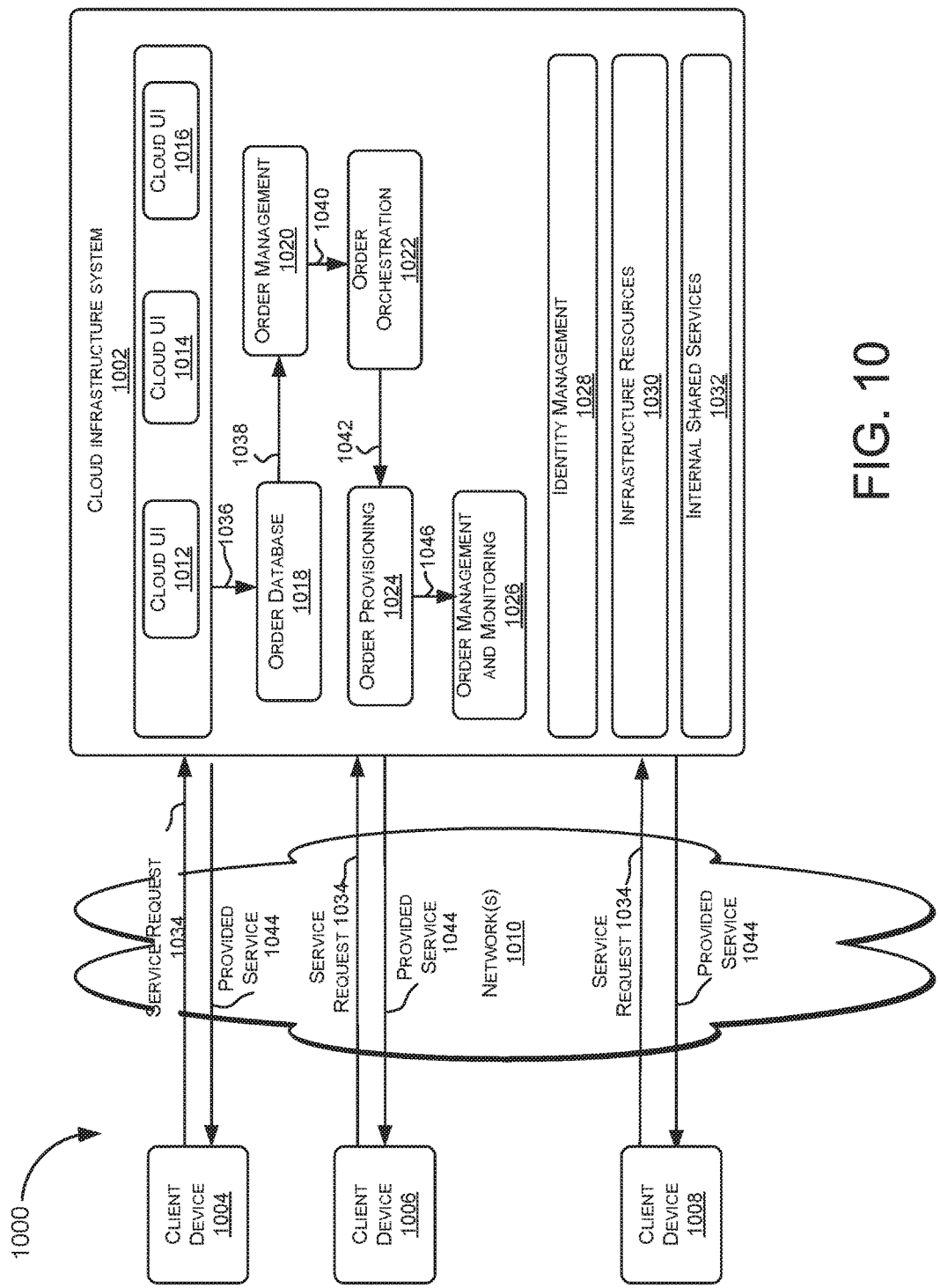
FIG. 10 is a simplified block diagram of one or more components of a system environment by which services provided by one or more components of an embodiment system may be offered as cloud services, in accordance with an embodiment of the present disclosure.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the disclosure. In some other embodiments, cloud infrastructure system 1002 may have more or fewer components than shown in the figure, may combine two or more components, or may have a different configuration or arrangement of components.

Client computing devices 1004, 1006, and 1008 may be devices similar to other client computing devices (e.g. desktop 208) associated with various embodiments of this disclosure.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for one or more connections between various devices.

Cloud infrastructure system 1002 may comprise one or more computers and/or servers that may include those described above such as, for example, app server 244.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.). Identity management module 1028 may also include the management of descriptive information about each customer and about how and by whom that descriptive information can be accessed and modified.

Figure 11:
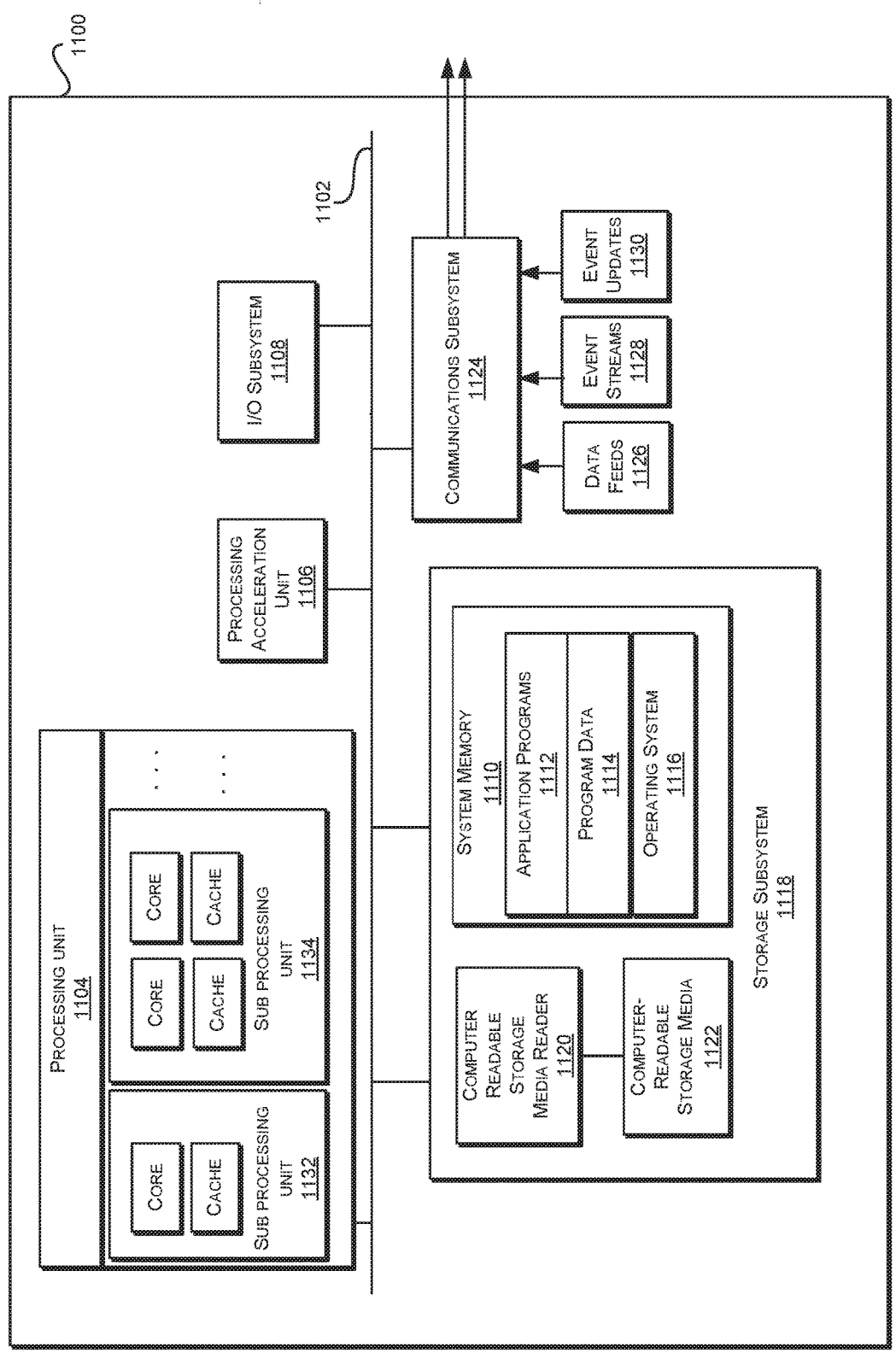
FIG. 11 illustrates an exemplary computer system 1200, in which various embodiments of the present disclosure may be implemented.

FIG. 11 illustrates an exemplary computer system 1100, in which various embodiments of the present disclosure may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based at least in part on non-volatile memory such as flash-memory based SSDs, enterprise flash drives, solid state ROM, and the like, SSDs based at least in part on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based at least in part on the disclosure and teachings provided herein, a person of ordinary skill in the art will appreciate other ways and/or methods to implement the various embodiments.

Figure 12:
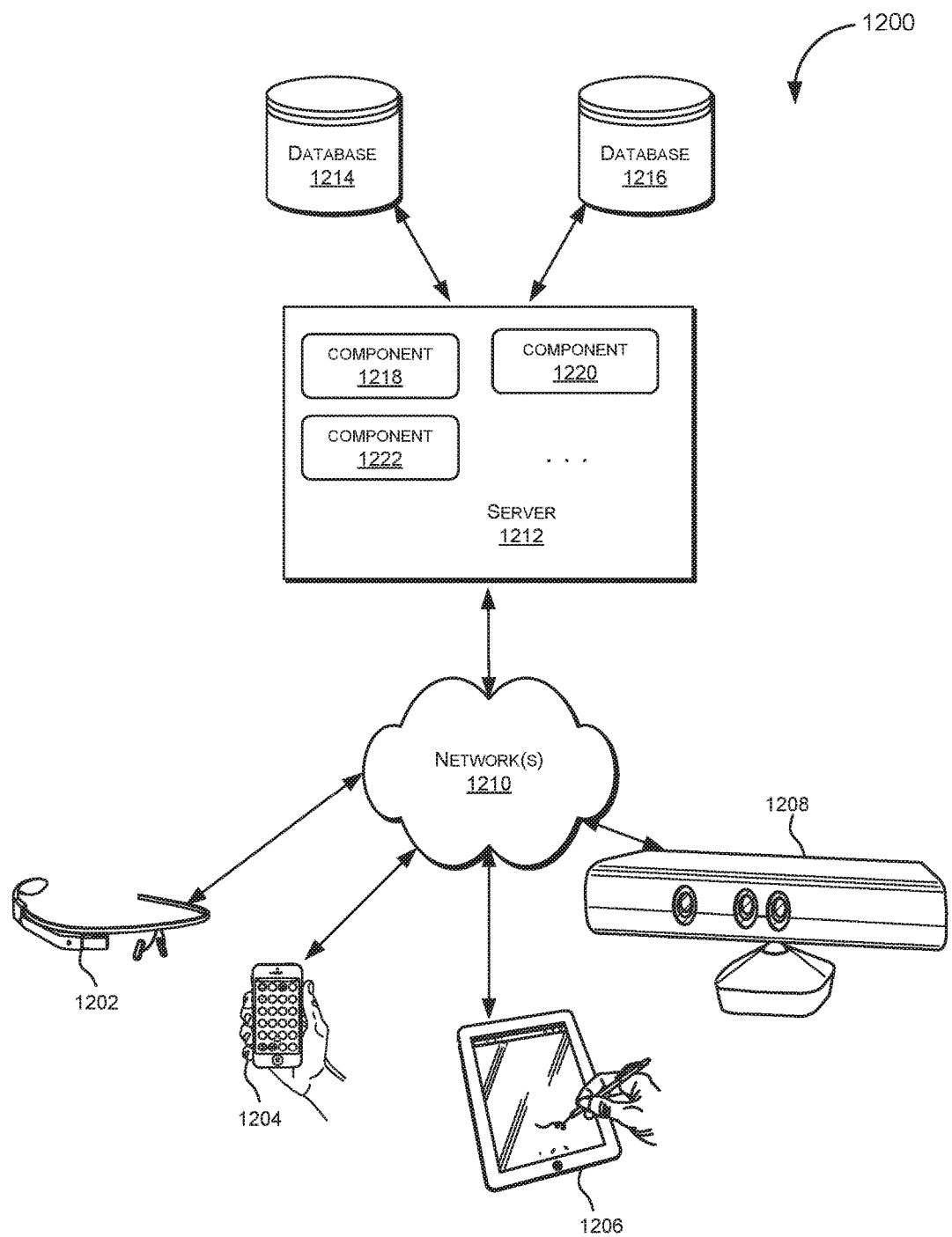
FIG. 12 depicts a simplified diagram of a distributed system for implementing one of the embodiments.

FIG. 12 depicts a simplified diagram of a distributed system 1200 for implementing one of the embodiments. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications provided by one or more of the components of the system. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in the figure is thus one example of a distributed system for implementing an embodiment system and is not intended to be limiting.

Client computing devices 1202, 1204, 1206, and/or 1208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 120, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based at least in part on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 1202.11 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for diagnosing extract-transform-load (ETL) errors in a cloud-based data integration system, comprising:
    initiating, by a computer system, a first process of an extract-transform-load process within the cloud-based data integration system, the first process comprising extracting data from a cloud-based application;
    receiving, by the computer system, a first data set associated with the first process;
    initiating, by the computer system, a second process of the extract-transform-load process within the cloud-based data integration system, the second process comprising caching the extracted data into a first schema, and the first schema being associated with the cloud-based application;
    receiving, by the computer system, a second data set associated with the second process;
    initiating, by the computer system, a third process of the extract-transform-load process within the cloud-based data integration system, the third process comprising loading the extracted data from a first schema to a second schema, the second schema being associated with a cloud-based data warehouse, and the first process, the second process, and the third process being distinct processes performed at different times during the extract-transform-load process;
    receiving, by the computer system, a third data set associated with the third process;
    determining, by the computer system, a first error and a second error in the extract-transform-load process based at least in part on the first data set, the second data set, or the third data set;
    determining, by the computer system, a first characteristic associated with the first error, the first characteristic indicating at least that the first error is correctable;
    determining, by the computer system, a second characteristic associated with the second error, the second characteristic indicating at least that the second error is fault tolerant;
    rejecting, by the computer system, based at least in part on the first characteristic, at least a portion of data associated with the first error; and
    transforming, by the computer system, based at least in part on the second characteristic, at least a portion of data associated with the second error.

2. The method of claim 1, wherein determining the first error comprises determining one or more errors with respect to the cloud-based application.

3. The method of claim 1, wherein determining the second error comprises determining one or more errors with respect to the second process.

4. The method of claim 1, wherein determining the first error or second error comprises determining one or more errors with respect to the third process.

5. The method of claim 1, wherein the first characteristic indicates one or more portions of the data associated with the first error can be corrected.

6. The method of claim 1, wherein the first characteristic indicates a system associated with the first error can be restarted.

7. The method of claim 1, wherein rejecting at least a portion of the data associated with the first error comprises correcting one or more portions of data associated with the first process.

8. The method of claim 1, wherein rejecting at least a portion of the data associated with the first error comprises correcting one or more portions of data associated with the third process.

9. The method of claim 1, wherein rejecting at least a portion of the data associated with the first error comprises correcting one or more portions of data associated with the second process.

10. The method of claim 1, wherein the second characteristic indicates that there is not a blocking issue associated with the second error.

11. A system, comprising:
    a memory configured to store computer-executable instructions; and
    a processor configured to access the memory and execute the computer-executable instructions to at least:
        initiate a first process of an extract-transform-load process within a cloud-based data integration system, the first process comprising extracting data from a cloud-based application;
        receive a first data set associated with the first process;
        initiate a second process of the extract-transform-load process within the cloud-based data integration system, the second process comprising caching the extracted data into a first schema, and the first schema being associated with the cloud-based application;

receive a second data set associated with the second process;

initiate a third process of the extract-transform-load process within the cloud-based data integration system, the third process comprising loading the extracted data from a first schema to a second schema, the second schema being associated with a cloud-based data warehouse, and the first process, the second process, and the third process being distinct processes performed at different times during the extract-transform-load process;

receive a third data set associated with the third process;

determine a first error and a second error in the extract-transform-load process based at least in part on the first data set, the second data set, or the third data set;

determine a first characteristic associated with the first error, the first characteristic indicating at least that the first error is correctable;

determine a second characteristic associated with the second error, the second characteristic indicating at least that the second error is fault tolerant;

process reject, based at least in part on the first characteristic, at least a portion of data associated with the first error; and transform, based at least in part on the second characteristic, at least a portion of data associated with the second error.

12. The system of claim 11, wherein the first error is determined based at least in part on one or more errors with respect to at the cloud-based application.

13. The system of claim 11, wherein the first characteristic indicates a system associated with the first error can be restarted.

14. The system of claim 11, wherein rejecting at least a portion of the data associated with the first error comprises correcting one or more portions of data associated with the third process, or correcting one or more portions of data associated with the second process.

15. The system of claim 11, wherein the computer-executable instructions are further executed to at least generate one or more notifications relevant to the first error that enables access to one or more web service tools for correcting the first error.

16. A computer-readable non-transitory medium configured to store computer-executable instruction that, when executed by one or more computer systems, cause the one or more computer systems to perform instructions comprising:

initiating a first process of an extract-transform-load process within a cloud-based data integration system, the first process comprising extracting data from a cloud-based application;

receiving a first data set associated with the first process;

initiating a second process of the extract-transform-load process within the cloud-based data integration system, the second process comprising caching the extracted data into a first schema, and the first schema being associated with the cloud-based application;

receiving a second data set associated with the second process;

initiating a third process of the extract-transform-load process within the cloud-based data integration system, the third process comprising loading the extracted data from a first schema to a second schema, the second schema being associated with a cloud-based data warehouse, and the first process, the second process, and the third process being distinct processes performed at different times during the extract-transform-load process;

receiving a third data set associated with the third process;

determining a first error and a second error in the extract-transform-load process based at least in part on the first data set, the second data set, or the third data set;

determining a first characteristic associated with the first error, the first characteristic indicating at least that the first error is correctable;

determining a second characteristic associated with the second error, the second characteristic indicating at least that the second error is fault tolerant;

rejecting, by the computer system, based at least in part on the first characteristic, at least a portion of data associated with the first error; and transforming, by the computer system, based at least in part on the second characteristic, at least a portion of data associated with the second error.

17. The computer-readable non-transitory medium of claim 16, wherein the instructions further comprise generating one or more notifications relevant to the first error or second error.

18. The computer-readable non-transitory medium of claim 17, wherein generating the one or more notifications relevant to the first error comprises generating a notification that enables access to one or more cloud-based tools for correcting the first error or second error.

19. The computer-readable non-transitory medium of claim 16, wherein determine the first error or second error comprises determining one or more errors with respect to data migration between the cloud-based application and the cloud-based data warehouse.

20. The computer-readable non-transitory medium of claim 16, wherein rejecting at least a portion of the data associated with the first error comprises correcting one or more portions of data associated with the second process.

* * * * *

UNITED STATES PATENT AND TRADEMARK OFFICE
CERTIFICATE OF CORRECTION

PATENT NO. : 10,191,802 B2
APPLICATION NO. : 15/158129
DATED : January 29, 2019
INVENTOR(S) : Nautiyal et al.

Page 1 of 1

It is certified that error appears in the above-identified patent and that said Letters Patent is hereby corrected as shown below:

In the Drawings

On sheet 1 of 12, in FIG. 1, under Reference Numeral 116, Line 2, delete "MANAGMENT" and insert -- MANAGEMENT --, therefor.

Signed and Sealed this
Fourth Day of February, 2020

Andrei Iancu
*Director of the United States Patent and Trademark Office*